(12) United States Patent
Knechtges (10) Patent No.: US 10,029,659 B2
(45) Date of Patent: Jul. 24, 2018

(54) ELECTROHYDRAULIC MOTOR VEHICLE BRAKE SYSTEM AND METHOD FOR OPERATING THE SAME

(71) Applicant: Lucas Automotive GmbH, Koblenz (DE)

(72) Inventor: Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/654,031

(22) PCT Filed: Nov. 28, 2013

(86) PCT No.: PCT/EP2013/074928
§ 371 (c)(1),
(2) Date: Jun. 19, 2015

(87) PCT Pub. No.: WO2014/095287
PCT Pub. Date: Jun. 26, 2014

(65) Prior Publication Data
US 2015/0353067 A1 Dec. 10, 2015

(30) Foreign Application Priority Data
Dec. 21, 2012 (DE) .......... 10 2012 025 291

(51) Int. Cl.
*B60T 7/12* (2006.01)
*B60T 7/04* (2006.01)
(Continued)

(52) U.S. Cl.
CPC .......... *B60T 7/042* (2013.01); *B60T 8/4077* (2013.01); *B60T 13/662* (2013.01); *B60T 13/686* (2013.01); *B60T 13/745* (2013.01)

(58) Field of Classification Search
CPC ........ B60T 2250/04; B60T 8/36; B60T 7/042; B60T 11/103; B60T 1/10; B60T 11/224;
(Continued)

(56) References Cited

U.S. PATENT DOCUMENTS 5,472,267 A * 12/1995 Tanguy .................. B60T 8/341
303/116.2
6,339,739 B1 * 1/2002 Folke .................... B60T 8/1755
180/170
(Continued)

FOREIGN PATENT DOCUMENTS

| CN | 101945787 A | 1/2011 |
|---|---|---|
| CN | 102458935 A | 5/2012 |

(Continued)

OTHER PUBLICATIONS

Chinese Office Action, Application No. 201380072450.5, dated Dec. 7, 2016.

*Primary Examiner* — Jelani A Smith
*Assistant Examiner* — Luis A Martinez Borrero
(74) *Attorney, Agent, or Firm* — MacMillan, Sobanski & Todd, LLC (57) ABSTRACT

The invention relates to a technique for operating an electrohydraulic motor vehicle brake system comprising a master cylinder (or any other cylinder-piston arrangement) that can be supplied with a hydraulic fluid from a reservoir, an electromechanical actuator for actuating a piston accommodated in the master cylinder, a wheel brake that can be coupled to the master cylinder, and a stop valve provided between the master cylinder and the wheel brake. According to an aspect of this technique, the method comprises the steps of: controlling the electromechanical actuator to build up hydraulic pressure on the wheel brake; controlling the stop valve to hold the hydraulic pressure already built up on the wheel brake; controlling the electromechanical actuator
(Continued)

to take in hydraulic fluid from the reservoir while monitoring a time response of a pressure drop in the master cylinder associated with the take-in; and interrupting the take-in depending on a result of the monitoring.

17 Claims, 9 Drawing Sheets

(51) Int. Cl.
    *B60T 8/40*         (2006.01)
    *B60T 13/66*       (2006.01)
    *B60T 13/68*       (2006.01)
    *B60T 13/74*       (2006.01)

(58) Field of Classification Search
CPC . B60T 7/122; B60T 8/171; B60T 8/32; B60T 11/16; B60T 8/4081; B60T 13/745; B60T 2270/604; B60T 17/002; B60T 8/50; B60T 7/12
USPC .. 701/70, 19, 78, 102, 103, 123, 37, 72, 74, 701/83, 93
See application file for complete search history.

(56) References Cited

U.S. PATENT DOCUMENTS

| | | | |
|---|---|---|---|
| 6,398,318 B1 | 6/2002 | Braun | |
| 6,749,270 B1* | 6/2004 | Lutz | B60T 8/4881 303/113.2 |
| 8,328,297 B2* | 12/2012 | Hatano | B60T 8/4081 303/113.4 |
| 8,494,745 B2* | 7/2013 | Schneider | B60T 7/107 303/3 |
| 8,540,324 B2 | 9/2013 | Leiber et al. | |
| RE44,677 E* | 12/2013 | Campau | B60T 7/042 303/113.4 |
| 8,864,244 B2 | 10/2014 | Leiber et al. | |
| 9,114,785 B2* | 8/2015 | Sokou | B60T 7/042 |
| 9,403,516 B2* | 8/2016 | Strengert | B60T 1/10 |
| 9,630,609 B2* | 4/2017 | Kim | B60T 17/221 |
| 2005/0151418 A1* | 7/2005 | Bickel | B60T 7/042 303/122 |
| 2005/0162008 A1* | 7/2005 | Bickel | B60T 8/4081 303/113.4 |
| 2010/0032597 A1* | 2/2010 | Beer | B60T 8/368 251/129.01 |
| 2011/0112774 A1 | 5/2011 | Gilles | |
| 2012/0013173 A1 | 1/2012 | Leiber et al. | |
| 2012/0253625 A1* | 10/2012 | Canuto | B60T 8/1755 701/72 |
| 2012/0299367 A1* | 11/2012 | Ross | B60T 8/4872 303/3 |
| 2012/0306261 A1 | 12/2012 | Leiber et al. | |
| 2013/0080016 A1* | 3/2013 | Bohn | B60T 7/042 701/78 |
| 2013/0119752 A1* | 5/2013 | Roll | B60T 8/326 303/189 |
| 2013/0127237 A1 | 5/2013 | Pfeiffer et al. | |
| 2013/0192454 A1 | 8/2013 | Hachtel | |
| 2013/0207452 A1 | 8/2013 | Gilles et al. | |
| 2013/0234501 A1 | 9/2013 | Leiber | |
| 2013/0298550 A1 | 11/2013 | Leiber et al. | |
| 2013/0304345 A1* | 11/2013 | Bohm | B60T 8/326 701/70 |
| 2014/0110997 A1* | 4/2014 | Biller | B60T 8/4081 303/9.62 |
| 2014/0197680 A1 | 7/2014 | Gilles | |
| 2014/0203626 A1* | 7/2014 | Biller | B60T 8/4081 303/10 |
| 2014/0368027 A1* | 12/2014 | Bohm | B60T 8/4081 303/14 |
| 2015/0021978 A1* | 1/2015 | Feigel | B60T 8/36 303/15 |
| 2015/0028667 A1* | 1/2015 | Leiber | B60T 13/662 303/15 |
| 2015/0224972 A1* | 8/2015 | Feigel | B60T 8/4081 303/15 |
| 2015/0239438 A1* | 8/2015 | Bohm | B60T 8/326 701/70 |
| 2015/0344013 A1* | 12/2015 | Knechtges | B60T 7/042 303/14 |
| 2015/0344014 A1* | 12/2015 | Knechtges | B60T 7/042 701/70 |
| 2016/0039398 A1* | 2/2016 | Roll | B60T 8/326 303/15 |
| 2016/0200299 A1* | 7/2016 | Bohm | B60T 7/042 303/9.62 |
| 2016/0200307 A1* | 7/2016 | Feigel | B60T 8/4081 303/6.01 |
| 2016/0297413 A1* | 10/2016 | Alford | B60T 8/4081 |

FOREIGN PATENT DOCUMENTS

| | | |
|---|---|---|
| CN | 102785643 A | 11/2012 |
| DE | 102006014269 A1 | 10/2007 |
| DE | 102006050277 A1 | 4/2008 |
| DE | 102008020566 A1 | 10/2009 |
| DE | 102009008944 A1 | 8/2010 |
| DE | 102010008033 A1 | 8/2011 |
| DE | 102010002406 A1 | 9/2011 |
| DE | 102010022493 A1 | 12/2011 |
| DE | 102010038704 A1 | 2/2012 |
| DE | 102010055044 A1 | 5/2012 |
| DE | 102011118365 A1 | 5/2013 |
| EP | 0933275 A2 | 8/1999 |
| WO | 2006111393 A1 | 10/2006 |
| WO | 2009083216 A2 | 7/2009 |
| WO | 2010091883 A1 | 8/2010 |
| WO | 2011141158 A2 | 11/2011 |
| WO | 2012034661 A1 | 3/2012 |
| WO | 2012152352 A1 | 11/2012 |

* cited by examiner

ELECTROHYDRAULIC MOTOR VEHICLE BRAKE SYSTEM AND METHOD FOR OPERATING THE SAME

CROSS-REFERENCE TO RELATED APPLICATIONS

This application is the National Phase of International Application PCT/EP2013/074928, filed Nov. 28, 2013 which designated the U.S. and was published on Jun. 26, 2014 as International Publication Number WO 2014/095287 A1. PCT/EP2013/074928 claims priority to German Patent Application No. 10 2012 025 291.9, filed Dec. 21, 2012. The disclosures of both applications are incorporated herein by reference.

BACKGROUND OF THE INVENTION

The invention relates generally to the field of motor vehicle brake systems. Specifically, an electrohydraulic motor vehicle brake system having an electromechanical actuator for actuating the brake system is described.

Electromechanical actuators have already been in use for some time in motor vehicle brake systems, for example to produce an electric park brake function (EPB). In electromechanical brake systems (EMB), they replace the conventional hydraulic cylinders at the wheel brakes.

Because of technical progress, the efficiency of electromechanical actuators has increased continuously. Consideration has therefore been given to the use of such actuators also for implementing modern vehicle dynamics control systems. Such control systems include an anti-lock braking system (ABS), a traction control system (TCS) or an electronic stability program (ESP), also known as vehicle stability control (VSC).

WO 2006/111393 A teaches an electrohydraulic brake system having a highly dynamic electromechanical actuator which performs pressure modulation during electronic stability control operation. The electromechanical actuator described in WO 2006/111393 A is provided to act directly on a master cylinder of the brake system. Because of the high dynamics of the electromechanical actuator, the hydraulic components of the brake system known from WO 2006/111393 A can be reduced to a single 2/2-way valve per wheel brake. In order to carry out pressure modulations at individual wheels, the valves are then activated individually or in groups in multiplex operation.

However, the minimisation to merely one valve per wheel brake also results in challenges, such as an undesired pressure equalisation when the valves are open at the same time. A solution based on a highly dynamic control behaviour therefor is provided in WO 2010/091883 A.

WO 2010/091883 A discloses an electrohydraulic brake system having a main cylinder and a tandem piston accommodated therein. The tandem piston can be actuated by means of an electromechanical actuator. The electromechanical actuator comprises an electric motor arranged concentrically with the tandem piston, and a gear arrangement which converts a rotational movement of the electric motor into a translational movement of the piston. The gear arrangement consists of a ball screw having a ball screw nut, which is coupled in a rotationally secure manner to a rotor of the electric motor, and a ball screw shaft, which acts on the tandem piston.

A further electrohydraulic brake system having an electromechanical actuator which acts on a master cylinder piston is known from WO 2012/152352 A. This system is able to work in a regenerative mode (generator operation).

SUMMARY OF THE INVENTION

An electrohydraulic motor vehicle brake system and a method for operating such a brake system which have an advantageous functionality in particular from the point of view of safety are to be provided.

According to one aspect there is provided a method for operating an electrohydraulic motor vehicle brake system having a cylinder-piston arrangement that can be supplied with hydraulic fluid from a reservoir, an electromechanical actuator for actuating a piston accommodated in the cylinder-piston arrangement, a wheel brake that can be coupled to the cylinder-piston arrangement, and a shut-off valve provided between the cylinder-piston arrangement and the wheel brake. The method comprises the steps of activating the electromechanical actuator for generating a hydraulic pressure at the wheel brake, activating the shut-off valve for locking the hydraulic pressure already generated at the wheel brake, activating the electromechanical actuator for an intake of hydraulic fluid from the reservoir while monitoring a temporal behaviour of a pressure drop in the cylinder-piston arrangement that accompanies the intake, and terminating the intake dependent on a result of the monitoring.

The intake can be terminated with the aim of preventing the hydraulic pressure in the cylinder-piston arrangement from falling excessively (in particular to a substantially pressureless or a negative pressure state) in the event of a fault. The fault can be detected on the basis of the temporal behaviour of the pressure drop in the cylinder-piston arrangement and can be associated, for example, with the shut-off valve, other valves or the cylinder-piston arrangement.

For terminating the intake, the electromechanical actuator can be correspondingly activated (e.g. to perform a delivery stroke instead of an intake stroke). Alternatively or in addition, one or more valves, including the shut-off valve or a valve provided between the cylinder-piston arrangement and the reservoir, can be activated, for example to counteract the pressure drop in the cylinder-piston arrangement in the event of a fault.

Activation of the shut-off valve for locking the hydraulic pressure and activation of the electromechanical actuator for an intake of hydraulic fluid can take place in connection with the detection of a necessity, within the context of the hydraulic pressure generation, for hydraulic fluid to be taken from the reservoir into the cylinder-piston arrangement. Activation of the shut-off valve can thereby precede the activation of the electromechanical actuator. The necessity for hydraulic fluid to be taken from the reservoir into the cylinder-piston arrangement can be detected in connection with a test phase. Alternatively or in addition, the necessity can be compensation for fading within the context of a braking operation. It is also conceivable that a necessary intake is associated with the fact that the piston is approaching (or has already reached) its stop on the delivery side, while the hydraulic pressure must be increased further.

According to one implementation, the intake can be terminated when the result of the monitoring indicates a lack of operability of the shut-off valve or activation of the shut-off valve. The lack of operability can be determined on the basis of a specified criterion or a combination of a plurality of specified criteria.

The intake can be terminated, for example, if the pressure drop in the cylinder-piston arrangement takes place more slowly than according to a specified time criterion. The specified time criterion can state that the pressure drop to a substantially pressureless state (e.g. below 5 bar or below 1 bar) must take place within approximately 5 to 50 ms. Alternatively or in addition, the intake can be interrupted before the pressure drop is approximately 10 to 40 bar (e.g. approximately 20 bar).

In connection with the termination (e.g. at the same time or subsequently), at least one further measure can be initiated. According to a variant, the shut-off valve is activated in order to open it. Alternatively or in addition, the electromechanical actuator is activated to increase the hydraulic pressure.

The method can be carried out within the context of a test phase in which the vehicle is at a standstill. In this manner, the operating safety of the motor vehicle brake system can be determined prior to a journey, and if necessary a fault indication can be emitted. For example, the test phase can take place after the ignition has been switched on but before a gear is engaged.

There is also provided a computer program product having program code means for carrying out the method presented herein when the computer program product is run on a processor. The computer program product can be included in a motor vehicle electronic control unit or motor vehicle electronic control unit system.

A further aspect is directed to an electrohydraulic motor vehicle brake system. The brake system comprises a cylinder-piston arrangement that can be supplied with hydraulic fluid from a reservoir, an electromechanical actuator for actuating a piston accommodated in the cylinder-piston arrangement, a wheel brake that can be coupled to the cylinder-piston arrangement, a shut-off valve provided between the cylinder-piston arrangement and the wheel brake, and an electronic control unit or electronic control unit system which is configured to activate the electromechanical actuator for generating a hydraulic pressure at the wheel brake, to activate the shut-off valve for locking the hydraulic pressure already generated at the wheel brake, to activate the electromechanical actuator for an intake of hydraulic fluid from the reservoir while monitoring a temporal behaviour of a pressure drop in the cylinder-piston arrangement that accompanies the intake, and to terminate the intake dependent on a result of the monitoring.

The cylinder-piston arrangement can be designed as the master cylinder of the motor vehicle brake system having a piston accommodated therein for generating hydraulic pressure at the wheel brakes. The piston can be in the form of a tandem piston which defines two hydraulic chambers in the master cylinder, each of which can be assigned to a brake circuit of the brake system. The piston of the master cylinder can be mechanically coupled or capable of being mechanically coupled directly to the electromechanical actuator. When the piston is actuated, the electromechanical actuator then acts directly on the piston of the master cylinder, as a result of which the piston is set in motion. Alternatively, the electromechanical actuator can cooperate with a (further) cylinder-piston arrangement of the brake system which is different from the master cylinder and which is fluidically coupled to the master cylinder on the outlet side. In this case, when the electromechanical actuator is actuated, there can be generated in the cylinder-piston arrangement that cooperates with the electromechanical actuator a hydraulic pressure which acts (e.g. directly) on the piston of the master cylinder and is thus provided for hydraulic actuation of the piston.

The cylinder-piston arrangement can further be designed as a cylinder-piston arrangement which is different from a master cylinder of the brake system and which is or can be fluidically coupled directly to the wheel brake for generating hydraulic pressure. This coupling can take place via one or more hydraulic brake circuits.

The brake system can further comprise a valve system for vehicle dynamics control. In this case, the shut-off valve can be arranged between the cylinder-piston arrangement and the valve system for vehicle dynamics control or can be part of that valve system. The multiplex operation can be carried out in connection with an vehicle dynamics control. The vehicle dynamics control can include at least one of the following control systems: an anti-lock braking system (ABS), a traction control system (TCS) and an electronic stability program (ESP, also called vehicle stability control, VSC).

The dimensions of the cylinder-piston arrangement can be such that it has no volume reserve to compensate for fading. For example, the diameter of the cylinder-piston arrangement can be from 15 to 23 mm and a maximum actuating stroke travel of a piston can be from 6 to 10 cm (from 3 to 5 cm per piston in the case of a tandem piston).

The apparatus can further comprise a mechanical actuator which can be coupled or is coupled to a brake pedal, for actuating the piston accommodated in the cylinder-piston arrangement. This mechanical actuator can be provided for operating an emergency brake (for example in the case of failure of the electromechanical actuator).

According to a first variant, in the brake system presented here, the electromechanical actuator is designed to actuate the piston of the cylinder-piston arrangement within the context of brake force amplification. The brake force to be amplified can in this case be exerted on the piston by means of the mechanical actuator. According to another variant, the electromechanical actuator is designed to actuate the piston for generating brake force. This variant can be used, for example, within the context of brake-by-wire (BBW) operation, in which the brake pedal is (normally) mechanically uncoupled from the master cylinder piston. In a brake system designed for BBW operation, the mechanical actuator is used to actuate the piston, for example, in the case of failure of a BBW component (that is to say in a push-through mode or in the case of emergency braking).

Depending on the configuration of the motor vehicle brake system, selective uncoupling of the brake pedal from the master cylinder piston can take place by means of an uncoupling device. In a brake system configured according to the BBW principle, permanent uncoupling, except for an emergency brake operation (in which the brake pedal is coupled to the master cylinder piston via the mechanical actuator), can be provided. In a regenerative brake system, such uncoupling can take place at least within the context of regenerative braking operation (generator operation). In other brake systems, the uncoupling device and an associated simulation device for providing a pedal reaction behaviour can also be omitted completely.

For activating the electromechanical actuator and optional further components of the motor vehicle brake system, the brake system can have suitable activating devices. These activating devices can include electrical, electronic or program-controlled assembly groups and combinations thereof. For example, the activating devices can be provided in a common electronic control unit or in a system of separate electronic control units (ECUs).

Other advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
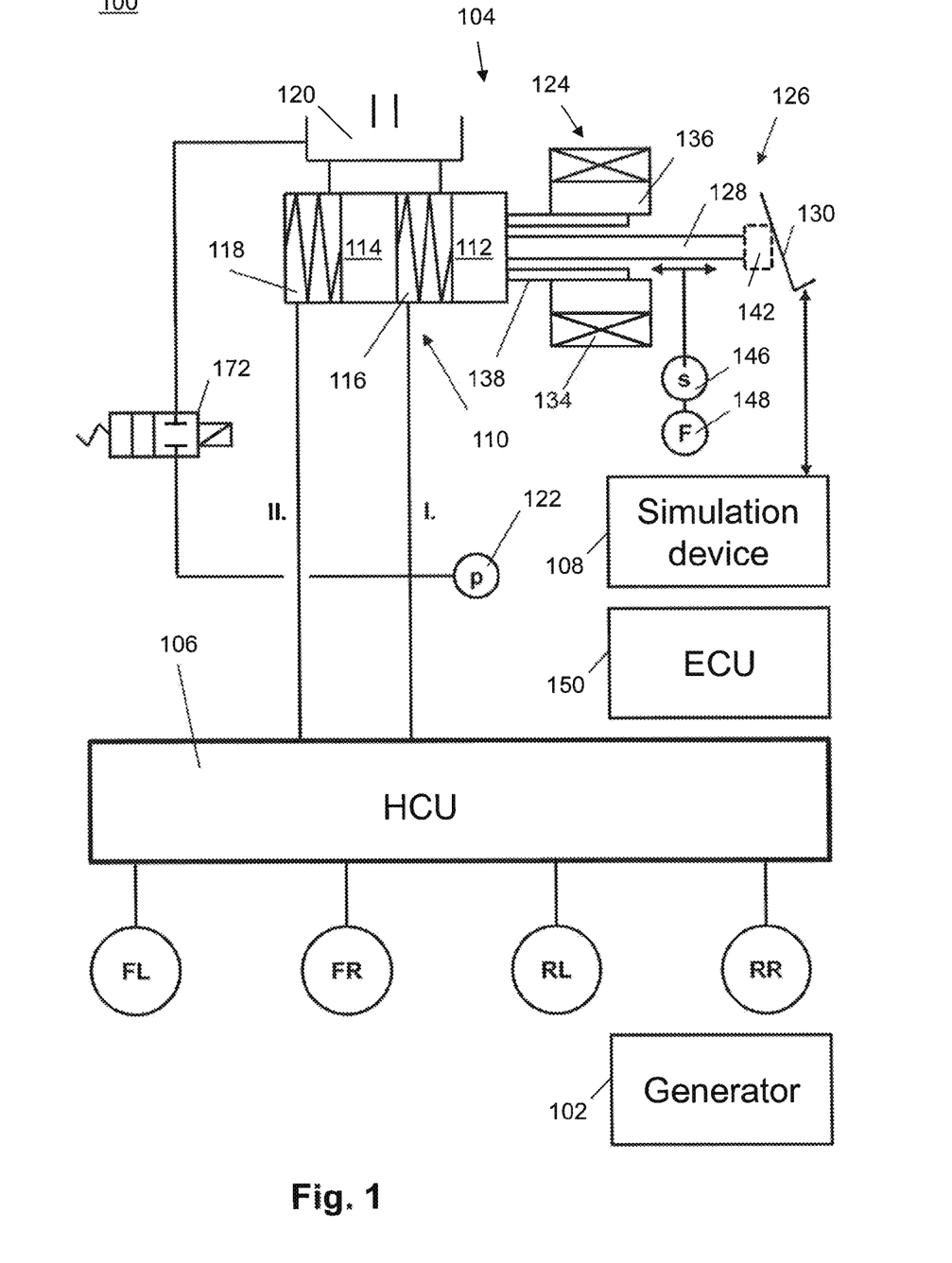
FIG. 1 shows a first embodiment of an electrohydraulic motor vehicle brake system.

FIG. 1 shows a first embodiment of a hydraulic motor vehicle brake system 100, which is based on the brake-by-wire (BBW) principle. The brake system 100 can optionally (e.g. in the case of hybrid vehicles) be operated in a regenerative mode. For that purpose there is provided an electric machine 102, which offers generator functionality and can selectively be connected to wheels and to an energy store, for example a battery (not shown).

As is shown in FIG. 1, the brake system 100 comprises a master cylinder assembly group 104 which can be mounted on a motor vehicle firewall. A hydraulic control unit (HCU) 106 of the brake system 100 is functionally arranged between the master cylinder assembly group 104 and four wheel brakes FL, FR, RL and RR of the motor vehicle. The HCU 106 is in the form of an integrated assembly group and comprises a plurality of separate hydraulic components and a plurality of fluid inlets and fluid outlets. A simulation device 108, shown only schematically, for providing a pedal reaction behaviour in service brake operation is also provided. The simulation device 108 can be based on a mechanical or hydraulic principle. In the last-mentioned case, the simulation device 108 can be connected to the HCU 106.

The master cylinder assembly group 104 has a master cylinder 110 with a piston accommodated displaceably therein. In the embodiment shown, the piston is in the form of a tandem piston having a primary piston 112 and a secondary piston 114 and defines in the master cylinder 110 two hydraulic chambers 116, 118 which are separate from one another. The two hydraulic chambers 116, 118 of the master cylinder 110 are each connected via a connection to a pressureless hydraulic fluid reservoir 120 in order to be supplied with hydraulic fluid. Each of the two hydraulic chambers 116, 118 is further coupled to the HCU 106 and in each case defines a brake circuit I. and II. In the embodiment shown, a hydraulic pressure sensor 122 is provided for the brake circuit I., which hydraulic pressure sensor could also be integrated into the HCU 106.

The master cylinder assembly group 104 further comprises an electromechanical actuator 124 and a mechanical actuator 126. Both the electromechanical actuator 124 and the mechanical actuator 126 allow the master cylinder piston to be actuated and act, for that purpose, on an inlet-side end face of that piston, more precisely of the primary piston 112. The actuators 124, 126 are so designed that they are able to actuate the master cylinder piston independently of one another (and separately or together).

The mechanical actuator 126 has a force transmission element 128 which is in the form of a rod and is able to act directly on the inlet-side end face of the primary piston 112. As is shown in FIG. 1, the force transmission element 128 is coupled to a brake pedal 130. It will be appreciated that the mechanical actuator 126 can comprise further components which are functionally arranged between the brake pedal 130 and the master cylinder 110. Such further components can be both mechanical and hydraulic in nature. In the last-mentioned case, the actuator 126 is in the form of a hydraulic-mechanical actuator 126.

The electromechanical actuator 124 has an electric motor 134 and a gear 136, 138 which follows the electric motor 134 on the drive side. In the embodiment shown, the gear is an arrangement of a rotatably mounted nut 136 and a shaft 138 which is in engagement with the nut 136 (e.g. via rolling elements such as balls) and is movable in the axial direction. In other embodiments, rack and pinion gears or other types of gear can be used.

In the present embodiment, the electric motor 134 has a cylindrical structural shape and extends concentrically with the force transmission element 128 of the mechanical actuator 126. More specifically, the electric motor 134 is arranged radially on the outside with respect to the force transmission element 128. A rotor (not shown) of the electric motor 134 is coupled in a rotationally secure manner to the gear nut 136, in order to set it in rotation. A rotary movement of the nut 136 is transmitted to the shaft 138 in such a manner that an axial displacement of the shaft 138 results. The left end face of the shaft 138 in FIG. 1 can thereby come into abutment (optionally via an intermediate member) against the right end face in FIG. 1 of the primary piston 112 and consequently displace the primary piston 112 (together with the secondary piston 114) to the left in FIG. 1. Furthermore, the piston arrangement 112, 114 can also be displaced to the left in FIG. 1 by the force transmission element 128 of the mechanical actuator 126, which force transmission element extends through the shaft 138 (which is in the form of a hollow body). Displacement of the piston arrangement 112, 114 to the right in FIG. 1 is effected by means of the hydraulic pressure prevailing in the hydraulic chambers 116, 118 (when the brake pedal 130 is released and optionally in the case of motor-driven displacement of the shaft 138 to the right).

In the variant of the master cylinder assembly group 104 shown in FIG. 1, the electromechanical actuator 124 is so arranged that it is able to act directly on the pistons (more precisely on the primary piston 112) of the master cylinder 110 in order to generate a hydraulic pressure at the wheel brakes. In other words, the piston 112 of the master cylinder 110 is mechanically actuated directly by the electromechanical actuator 124. In an alternative form of the master cylinder assembly group 104, the piston of the master cylinder 110 can be actuated hydraulically (not shown in FIG. 1) with the aid of the electromechanical actuator 124. In this case, the master cylinder 110 can be fluidically coupled to a further cylinder-piston arrangement which cooperates with the electromechanical actuator 124. Specifically, the cylinder-piston arrangement coupled to the electromechanical actuator 124 can be fluidically coupled on the outlet side to the primary piston 112 of the master cylinder 110 in such a manner that a hydraulic pressure generated in the cylinder-piston arrangement acts directly on the primary piston 112 and thus leads to actuation of the primary piston 112 in the master cylinder 110. In one embodiment, the primary piston 112 is then displaced (displacement to the left in FIG. 1) in the master cylinder 110, because of the acting hydraulic pressure, until the hydraulic pressure generated in the master cylinder chambers 116, 118 corresponds to the hydraulic pressure generated in the additional cylinder-piston arrangement.

As is shown in FIG. 1, an uncoupling device 142 is functionally provided between the brake pedal 130 and the force transmission element 128. The uncoupling device 142 allows the brake pedal 130 to be selectively uncoupled from the piston arrangement 112, 114 in the master cylinder 110, for example by interrupting a force transmission path. The modes of operation of the uncoupling device 142 and of the simulation device 108 will be described in greater detail hereinbelow. It should be pointed out in this connection that the brake system 100 shown in FIG. 1 is based on the brake-by-wire (BBW) principle. This means that, within the context of normal service braking, both the uncoupling device 142 and the simulation device 108 are activated. Accordingly, the brake pedal 130 is uncoupled from the force transmission element 128 (and thus from the piston arrangement 112, 114 in the master cylinder 110), and actuation of the piston arrangement 112, 114 can take place only via the electromechanical actuator 124. The usual pedal reaction behaviour is in this case provided by the simulation device 108 coupled to the brake pedal 130.

Accordingly, within the context of service braking, the electromechanical actuator 124 performs the brake force generation function. A brake force requested by depression of the brake pedal 130 is generated by the shaft 138 being displaced to the left in FIG. 1 by means of the electric motor 134 and the primary piston 112 and the secondary piston 114 of the master cylinder 110 thus also being moved to the left. In this manner, hydraulic fluid is conveyed from the hydraulic chambers 116, 118 via the HCU 106 to the wheel brakes FL, FR, RL and RR.

The level of the resulting brake force of the wheel brakes FL, FR, RL and RR is adjusted in dependence on a brake pedal actuation detected by sensor. For that purpose, a displacement sensor 146 and a force sensor 148 are provided, the output signals of which are evaluated by an electronic control unit (ECU) 150 which activates the electric motor 134. The displacement sensor 146 detects an actuating stroke travel associated with the actuation of the brake pedal 130, while the force sensor 148 detects an actuation force associated therewith. In dependence on the output signals of the sensors 146, 148 (and optionally of the pressure sensor 122), an activation signal for the electric motor 134 is generated by the electronic control unit 150.

Now that the procedures in the case of service braking have been explained in greater detail, emergency braking operation (push-through mode) will now be described briefly. Emergency braking operation is, for example, the consequence of failure of the vehicle battery or of a component of the electromechanical actuator 124. Deactivation of the uncoupling device 142 (and of the simulation device 108) in emergency braking operation allows the brake pedal 130 to be coupled directly to the master cylinder 110, namely via the force transmission element 128. Emergency braking is initiated by depressing the brake pedal 130. The actuation of the brake pedal is then transmitted via the force transmission element 128 to the master cylinder 110. The piston arrangement 112, 114 is consequently displaced to the left in FIG. 1. As a result, hydraulic fluid for generating brake force is conveyed from the hydraulic chambers 116, 118 of the master cylinder 110 via the HCU 106 to the wheel brakes FL, FR, RL and RR.

According to a first embodiment, the HCU 106 is of a construction which is conventional in principle with regard to vehicle dynamics control operation (brake control functions such as ABS, TCS, ESP, etc.), with a total of 12 valves (in addition to valves which are used, for example, in connection with the activation or deactivation of the uncoupling device 142 and the simulation device 106). Because the electromechanical actuator 124 is then (optionally only) activated within the context of brake force generation, the additional control functions are provided in a known manner by means of the HCU 106 (and optionally a separate hydraulic pressure generator such as a hydraulic pump). It is, however, also possible to dispense with a hydraulic pressure generator in the HCU 106. The electromechanical actuator 124 then additionally also performs pressure modulation within the context of control operation. A corresponding control mechanism will to that end be incorporated into the electronic control unit 150 provided for the electromechanical actuator 124.

As is shown in FIG. 1, the brake system 100 further comprises a valve 172, which is in the form of a shut-off valve and can be integrated into the HCU 106. The valve 172 is functionally provided between the hydraulic chamber 116 and the pressureless hydraulic fluid reservoir 120. In some embodiments, a further such valve (not shown) can functionally be present between the other hydraulic chamber 118 and the reservoir 120. In general, the valve 172 is provided between the master cylinder 110 and the reservoir.

The valve 172 allows the hydraulic chambers 116, 118 to be topped up. Such topping up is necessary, for example, when almost all the hydraulic fluid has been removed from the hydraulic chambers 116, 118 during an ongoing braking operation (i.e. the pistons 112, 114 are approaching their stop on the left in FIG. 1) and yet the hydraulic pressure still has to be increased further.

For topping up, the wheel brakes FL, FR, RL and RR are fluidically separated from the hydraulic chambers 116, 118 via associated valves of the HCU 106 (not shown in FIG. 1). The hydraulic pressure prevailing at the wheel brakes FL, FR, RL and RR is thus "locked". The valve 172 is then opened. With a subsequent return stroke of the pistons 112, 114 (to the right in FIG. 3), hydraulic fluid is then taken from the pressureless reservoir 120 into the two chambers 116, 118 (because of the floating master cylinder pistons 112, 114). Finally, the valve 172 can be closed again and the hydraulic connection to at least one of the wheel brakes FL, FR, RL and RR can be opened again. With a subsequent delivery stroke of the pistons 112, 114 (to the left in FIG. 1), the previously "locked" hydraulic pressure is increased further.

The valve 172 can further be used for regenerative brake operation and for hydraulic pressure reduction in the event of system faults. These uses will be described in greater detail below.

Figure 2:
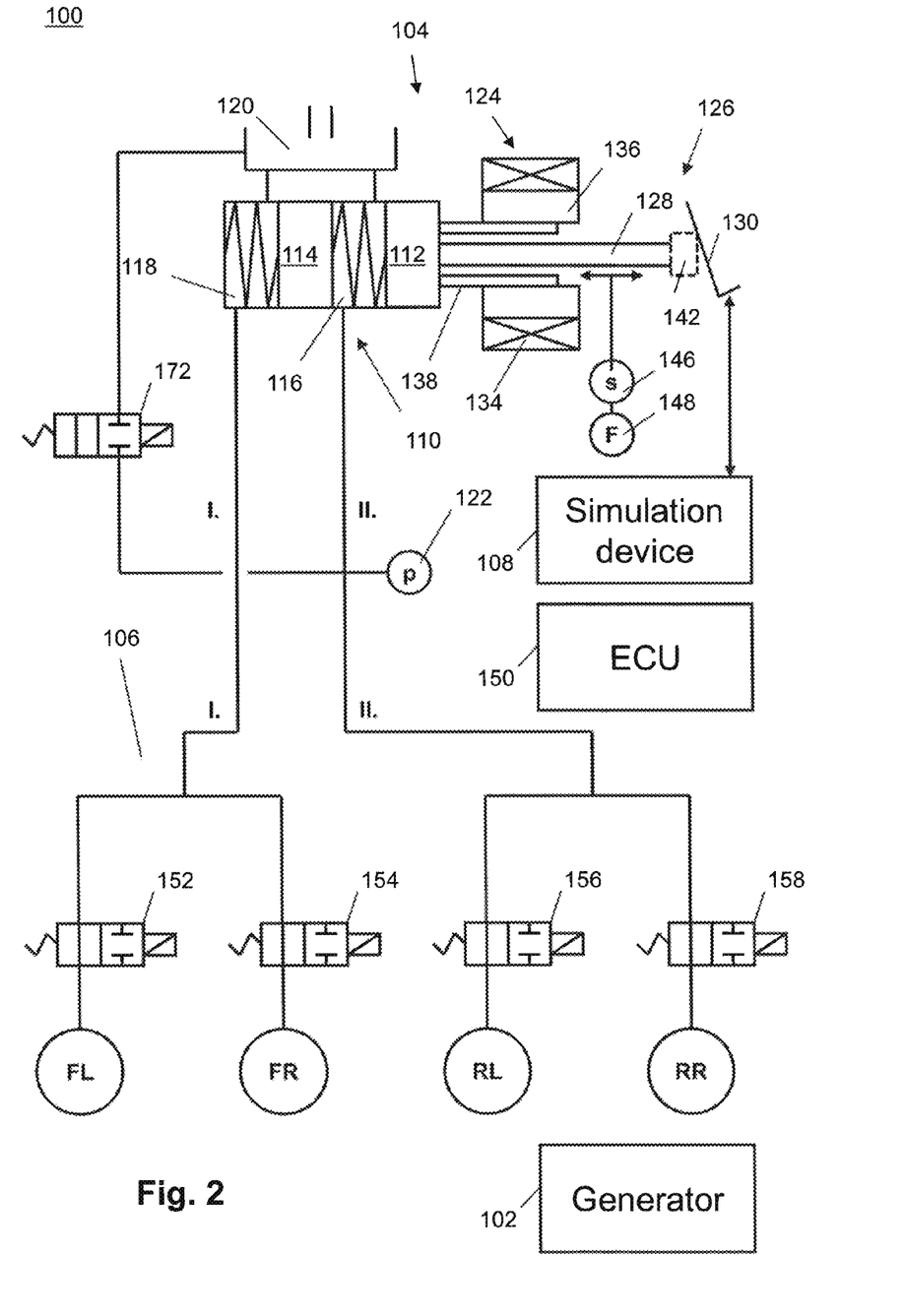
FIG. 2 shows a second embodiment of an electrohydraulic motor vehicle brake system.

In a further embodiment according to FIG. 2, the specific valves in the HCU 106 for vehicle dynamics control operation (e.g. TCS and ESP operation) can be omitted apart from four valves 152, 154, 156, 158. In this other embodiment of the HCU 106, therefore, the valve arrangement known from WO 2010/091883 A or WO 2011/141158 A (see FIG. 15)

having only four valves 152, 154, 156, 158 (and the corresponding activation) can be used. The hydraulic pressure modulation in controlled operation then also takes place by means of the electromechanical actuator 124. In other words, the electromechanical actuator 124 is in this case activated not only for brake force generation within the context of service braking, but also, for example, for the purpose of vehicle dynamics control (that is to say, for example, in ABS and/or TCS and/or ESP controlled operation). Together with the activation of the electromechanical actuator 124, the valves 152, 154, 156, 158 are activated at the individual wheels or the individual wheel groups in multiplex operation. In the implementation shown in FIG. 2, no further valves for vehicle dynamics control purposes are present between the valves 152, 154, 156, 158 and the master cylinder.

Multiplex operation can be time-division multiplex operation. Individual part slots can generally be specified. One or more of the valves 152, 154, 156, 158 can in turn be assigned to an individual time slot, which valves are activated (for example by changing the switching state from open to closed and/or vice versa) one or more times during the corresponding time slot. According to one embodiment, exactly one time slot is assigned to each of the valves 152, 154, 156, 158. One or more further time slots can be assigned to one or more further valve arrangements (not shown in FIG. 2).

In multiplex operation, a plurality or all of the valves 152, 154, 156, 158 can first be open, for example, and at the same time a hydraulic pressure can be generated at a plurality or all of the associated wheel brakes FL, FR, RL and RR by means of the electromechanical actuator 124. When a target pressure for an individual wheel has been reached, the corresponding valve 152, 154, 156, 158 then closes again timeslot-synchronously, while one or more further valves 152, 154, 156, 158 remain open until the target pressure has also been reached there too. The four valves 152, 154, 156, 158 are therefore opened and closed in multiplex operation individually per wheel or wheel group in dependence on the respective target pressure.

According to one embodiment, the valves 152, 154, 156, 158 are in the form of 2/2-way valves and are designed, for example, as non-regulable shut-off valves. In this case, therefore, it is not possible to adjust an opening cross-section, as would be the case with proportional valves, for example. In another embodiment, the valves 152, 154, 156, 158 are in the form of proportional valves with an adjustable opening cross-section.

Figure 3:
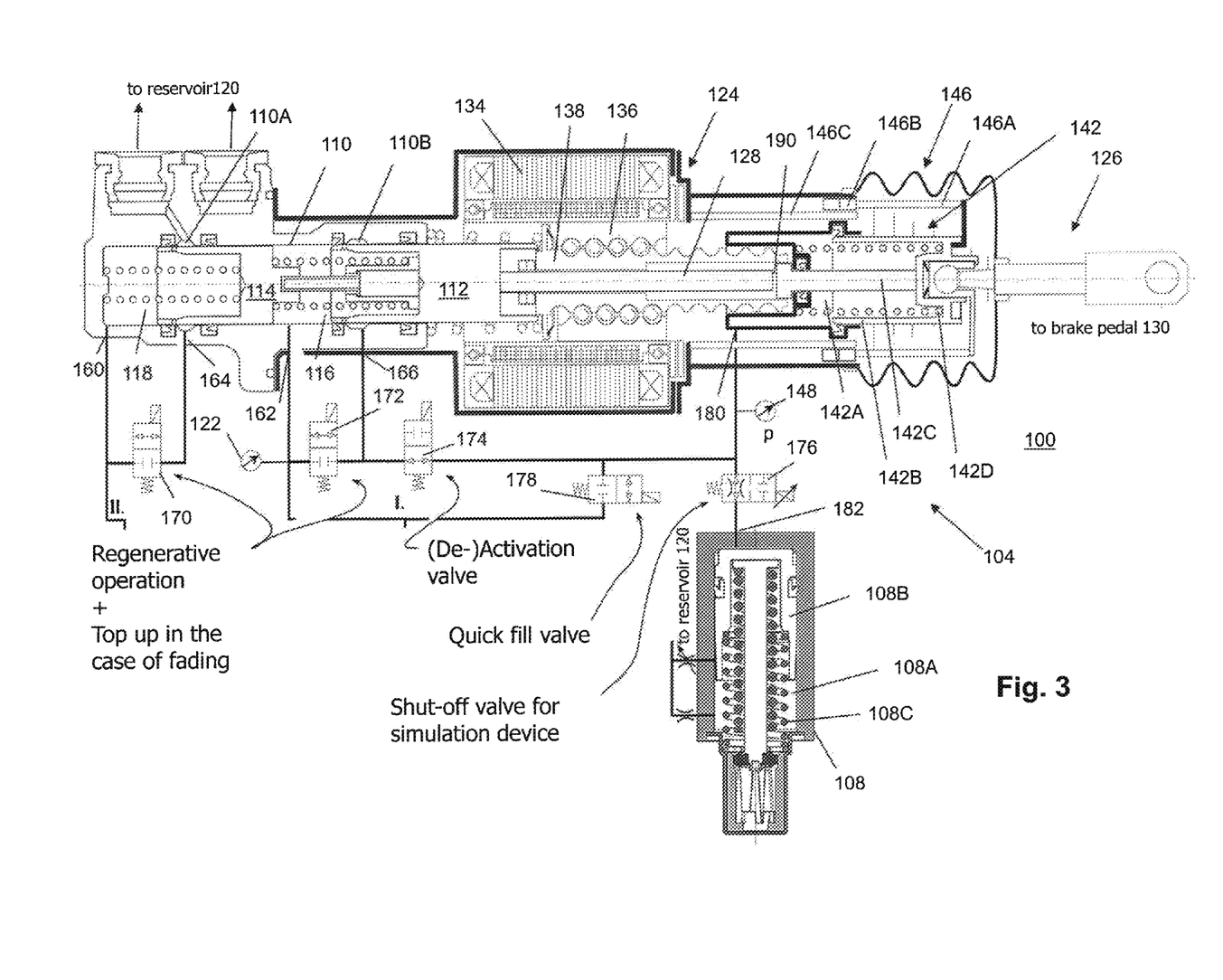
FIG. 3 shows a third embodiment of an electrohydraulic motor vehicle brake system.

FIG. 3 shows a more detailed embodiment of a motor vehicle brake system 100, which is based on the functional principle explained in connection with the schematic examples of FIGS. 1 and 2. The same or similar elements have been provided with the same reference numerals as in FIGS. 1 and 2, and they will not be explained hereinbelow. For the sake of clarity, the ECU, the wheel brakes, the valve units of the HCU associated with the wheel brakes, and the generator for regenerative braking operation have not been shown.

The motor vehicle brake system 100 illustrated in FIG. 3 also comprises two brake circuits I. and II., two hydraulic chambers 116, 118 of a master cylinder 110 again being assigned to exactly one brake circuit I., II. The master cylinder 110 has two connections per brake circuit I., II. The two hydraulic chambers 116, 118 open into a first connection 160, 162, via which hydraulic fluid can be conveyed from the respective chamber 116, 118 into the associated brake circuit I., II. Furthermore, each of the brake circuits I., II. can be connected via a second connection 164, 166, which opens into a corresponding annular chamber 110A, 110B in the master cylinder 110, to the pressureless hydraulic fluid reservoir (reference numeral 120 in FIG. 1), which is not shown in FIG. 3.

Between the first connection 160, 162 and the second connection 164, 166 of the master cylinder 110 there is provided a valve 170, 172, which in the embodiment shown is in the form of a 2/2-way valve. By means of the valves 170, 172, the first and second connections 160, 162, 164, 166 can selectively be connected to one another. This corresponds to a "hydraulic short circuit" between the master cylinder 110 on the one hand and, on the other hand, the pressureless hydraulic fluid reservoir (which is then connected via the annular chambers 110A, 110B to the hydraulic chambers 116, 118). In this state, the pistons 112, 114 in the master cylinder 110 can be displaced by the electromechanical actuator 124 or the mechanical actuator 126 substantially without resistance ("empty path activation"). The two valves 170, 172 thus permit, for example, regenerative braking operation (generator operation). In this case, the hydraulic fluid displaced from the hydraulic chambers 116, 118 by a delivery movement in the master cylinder 110 is not conveyed to the wheel brakes but to the pressureless hydraulic fluid reservoir, without the generation of hydraulic pressure at the wheel brakes (which is generally undesirable in regenerative braking operation). A braking action is then achieved in regenerative braking operation by the generator (see reference numeral 102 in FIGS. 1 and 2).

It should be pointed out that regenerative braking operation can be implemented per axle. Therefore, in the case of axle-related brake circuit division, in regenerative braking operation one of the two valves 170, 172 can be closed and the other open.

The two valves 170, 172 further permit the reduction of hydraulic pressure at the wheel brakes. Such a pressure reduction can be desirable in the event of failure (e.g. blocking) of the electromechanical actuator 124 or in the case of vehicle dynamics control operation, in order to avoid a return stroke of the electromechanical actuator 124 (e.g. in order to avoid a reaction on the brake pedal). Also, for pressure reduction, the two valves 170, 172 are changed into their open position, as a result of which hydraulic fluid is able to flow from the wheel brakes via the annular chambers 110A, 110B in the master cylinder 110 back into the hydraulic fluid reservoir.

Finally, the valves 170, 172 also allow the hydraulic chambers 116, 118 to be topped up. Such topping up can be necessary during an ongoing braking operation (e.g. because of so-called brake fading). For topping up, the wheel brakes are fluidically separated from the hydraulic chambers 116, 118 via associated valves of the HCU (not shown in FIG. 3). The hydraulic pressure prevailing at the wheel brakes is thus "locked". The valves 170, 172 are then opened. With a subsequent return stroke of the pistons 112, 114 provided in the master cylinder 110 (to the right in FIG. 3), hydraulic fluid is taken from the pressureless reservoir into the chambers 116, 118. Finally, the valves 170, 172 can be closed again and the hydraulic connections to the wheel brakes can be opened again. With a subsequent delivery stroke of the pistons 112, 114 (to the left in FIG. 3), the previously "locked" hydraulic pressure can be increased again.

As shown in FIG. 3, both a simulation device 108 and an uncoupling device 142 are based on a hydraulic principle in the present embodiment. Both devices 108, 142 each comprise a cylinder 108A, 142A for receiving hydraulic fluid as well as a piston 108B, 142B accommodated in the respective cylinder 108A, 142A. The piston 142B of the uncoupling device 142 is mechanically coupled to a brake pedal (see reference numeral 130 in FIGS. 1 and 2), which is not shown in FIG. 3. The piston 142B further comprises a prolongation 142C which extends through the cylinder 142A in the axial direction. The piston prolongation 142C runs coaxially with a force transmission element 128 for the primary piston 112 and is mounted upstream thereof in the actuation direction of the brake pedal.

Each of the two pistons 108B, 142B is biased in its starting position by a resilient element 108C, 142D (here in each case a helical spring). The characteristic curve of the resilient element 108C of the simulation device 108 hereby defines the desired pedal reaction behaviour.

As is further shown in FIG. 3, the motor vehicle brake system 100 in the present embodiment comprises three further valves 174, 176, 178, which are here in the form of 2/2-way valves. It will be appreciated that some or all of these three valves 174, 176, 178 can be omitted in other embodiments in which the corresponding functionalities are not required. It will further be appreciated that all these valves can be part of a single HCU block (see reference numeral 106 in FIGS. 1 and 2). This HCU block can comprise further valves (see FIG. 4 below).

The first valve 174 is provided on the one hand between the uncoupling device 142 (via a connection 180 provided in the cylinder 142A) and the simulation device 108 (via a connection 182 provided in the cylinder 108A) and on the other hand the pressureless hydraulic fluid reservoir (via the connection 166 of the master cylinder 110). The second valve 176, which in its pass position has a throttling characteristic, is arranged upstream of the connection 182 of the cylinder 108A. Finally, the third valve 178 is provided between the hydraulic chamber 116 (via the connection 116) and the brake circuit I. on the one hand and the cylinder 142A of the uncoupling device 142 (via the connection 180) on the other hand.

The first valve 174 permits selective activation and deactivation of the uncoupling device 142 (and indirectly also of the simulation device 108). If the valve 174 is in its open position, the cylinder 142A of the uncoupling device 142 is hydraulically connected to the pressureless hydraulic reservoir. In this position, the uncoupling device 142 is deactivated in accordance with emergency braking operation. Furthermore, the simulation device 108 is also deactivated.

Opening of the valve 174 has the effect that, upon displacement of the piston 142B (as a result of actuation of the brake pedal), the hydraulic fluid received in the cylinder 142A can be conveyed largely without resistance into the pressureless hydraulic fluid reservoir. This operation is substantially independent of the position of the valve 176, because this has a significant throttling effect even in its open position. Accordingly, the simulation device 108 is also deactivated indirectly in the open position of the valve 174.

If the brake pedal is actuated in the open state of the valve 174, the piston prolongation 142C closes a gap 190 to the force transmission element 128 and consequently comes into abutment against the force transmission element 128. The force transmission element 128, after closing of the gap 190, is acted upon by the displacement of the piston prolongation 142C and then actuates the primary piston 112 (and—indirectly—the secondary piston 114) in the master brake cylinder 110. This corresponds to the direct coupling, already described in connection with FIG. 1, of the brake pedal and the master cylinder piston for generating hydraulic pressure in the brake circuits I., II. in emergency braking operation.

With the valve 174 closed (and valve 178 closed), on the other hand, the uncoupling device 142 is activated. This corresponds to service braking operation. Upon actuation of the brake pedal, hydraulic fluid is thereby conveyed from the cylinder 142A into the cylinder 108A of the simulation device 108. In this manner, the simulator piston 108B is displaced against the counter-force provided by the resilient element 108C, so that the usual pedal reaction behaviour is established. At the same time, the gap 190 between the piston prolongation 142C and the force transmission element 128 is maintained. As a result, the brake pedal is mechanically uncoupled from the master cylinder.

In the present embodiment, the gap 190 is maintained as a result of the fact that, by means of the electromechanical actuator 124, the primary piston 112 is moved to the left in FIG. 3 at least as quickly as the piston 142B moves to the left as a result of actuation of the brake pedal. Because the force transmission element 128 is coupled mechanically or otherwise (e.g. magnetically) to the primary piston 112, the force transmission element 128 moves together with the primary piston 112 upon actuation thereof by means of the gear shaft 138. The fact that the force transmission element 128 is moved with the primary piston allows the gap 190 to be maintained.

Maintenance of the gap 190 in service braking operation requires precise detection of the distance travelled by the piston 142B (and accordingly of the pedal travel). A displacement sensor 146 based on a magnetic principle is provided for that purpose.

The displacement sensor 146 comprises a plunger 146A which is rigidly coupled to the piston 142B and at the end of which there is mounted a magnet element 146B. The movement of the magnet element 146B (i.e. the distance travelled by the plunger 146B or piston 142B) is detected by means of a Hall sensor 146C. An output signal of the Hall sensor 146C is evaluated by an electronic control unit (see reference numeral 150 in FIGS. 1 and 2), which is not shown in FIG. 3. The electromechanical actuator 124 can then be activated on the basis of this evaluation.

Now to the second valve 176, which is arranged upstream of the simulation device 108 and can be omitted in some embodiments. This valve 176 has a specified or adjustable throttling function. By means of the adjustable throttling function, a hysteresis, for example, or other characteristic curve for the pedal reaction behaviour can be achieved. Furthermore, by selectively blocking the valve 176, the movement of the piston 142B (with valves 174, 178 closed) and thus the brake pedal travel can be limited.

The third valve 178, in its open position, allows hydraulic fluid to be conveyed from the piston 142A into the braking circuit I. or the hydraulic chamber 116 of the master cylinder 110 and vice versa. The conveying of fluid from the piston 142A into the braking circuit I. permits, for example, rapid braking (e.g. before the onset of the conveying action of the electromechanical actuator 124), the valve 178 being closed again immediately. Furthermore, with the valve 178 open, a hydraulic reaction (e.g.

a pressure modulation produced by means of the electromechanical actuator 124 in vehicle dynamics control operation) can be achieved via the piston 142B on the brake pedal.

In a hydraulic line which opens into the connection 180 of the cylinder 142A there is provided a pressure sensor 148 whose output signal gives information about the actuating force on the brake pedal. The output signal of this pressure sensor 148 is evaluated by an electronic control unit not shown in FIG. 3. On the basis of this evaluation, one or more of the valves 170, 172, 174, 176, 178 can be activated to produce the functionalities described above. Furthermore, the electromechanical actuator 124 can be activated on the basis of this evaluation.

Figure 4:
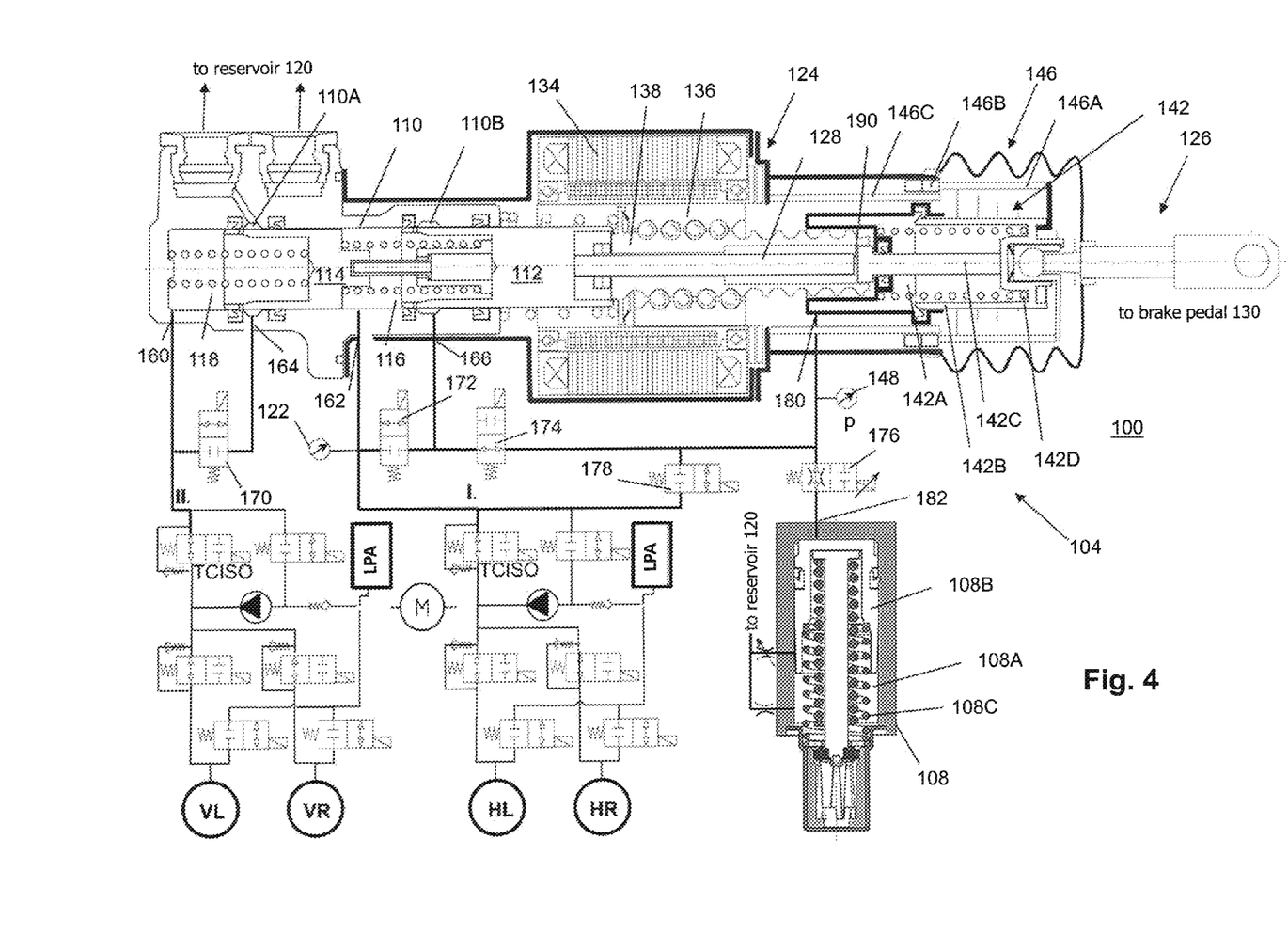
FIG. 4 shows a fourth embodiment of an electrohydraulic motor vehicle brake system.

The HCU 106 shown in FIG. 1 can be used in the brake system shown in FIG. 3. An example of a configuration of this HCU 106 for the brake system 100 according to FIG. 3 is shown in FIG. 4. A total of 12 (additional) valves for performing the vehicle dynamics control functions are provided here, as well as an additional hydraulic pump. In an alternative embodiment, the multiplex arrangement according to FIG. 2 (with a total of four valves in addition to the valves illustrated in FIG. 3) can also be used for the brake system 100 shown in FIG. 3.

In the embodiments described above, the size of the master cylinder, and thus the maximum volume of hydraulic fluid that can be conveyed, is so chosen that, at a specified pedal transmission ratio (travel/force) at 500 N pedal force, a vehicle deceleration of approximately 0.6 g is still achievable. This requirement leads to a typical diameter of the master cylinder 110 of approximately from 18 to 20 mm. In order to provide a sufficient reserve of hydraulic fluid volume in the case of such a hydraulic cylinder diameter, the master cylinder stroke would have to be disproportionately long. Often, therefore, excessive volume reserves, which are required only in special cases (e.g. fading), are dispensed with. The brake system 100 must therefore top up hydraulic fluid from the pressureless reservoir 120 into the master cylinder 110 if additional volume is required.

A top up becomes necessary if, for example, during an ongoing braking operation it is detected that the volume of hydraulic fluid (still) present in the hydraulic chambers 116, 118 is not sufficient to increase further the hydraulic pressure at one, a plurality or all of the wheel brakes FL, FR, RL and RR.

During the top up operation, the hydraulic pressure in the master cylinder 110 falls sharply for a short time. On the other hand, the hydraulic pressure already generated at the wheel brakes FL, FR, RL and RR must be maintained. For this reason, shut-off valves provided in the HCU 106 (e.g. the multiplex valves 152, 154, 156 and 158 according to FIG. 2 or the TCISO valves according to FIG. 4) are closed in order to contain the hydraulic pressure at the wheel brakes FL, FR, RL and RR. In this connection it is necessary to ensure both operability of the shut-off valves and activation thereof (in particular with regard to the electronic control unit 150). Otherwise there would be a risk of the hydraulic pressure at one or more of the wheel brakes FL, FR, RL and RR collapsing within the context of the intake operation in the master cylinder 110 and the vehicle deceleration thus being reduced.

Thus, in the event of a fault, the reduction in deceleration should be not more than 0.1 to 0.3 g within approximately 200 ms. For this reason, during the reduction of the hydraulic pressure in the master cylinder 110 after initiation of the top up operation, faulty non-closure of shut-off valves to the wheel brakes FL, FR, RL and RR must be detected. Such detection has to take place before the pressure drop in the master cylinder 110 has reached approximately 20 bar (which would correspond to a reduction in deceleration of approximately 0.2 g).

Figure 5:
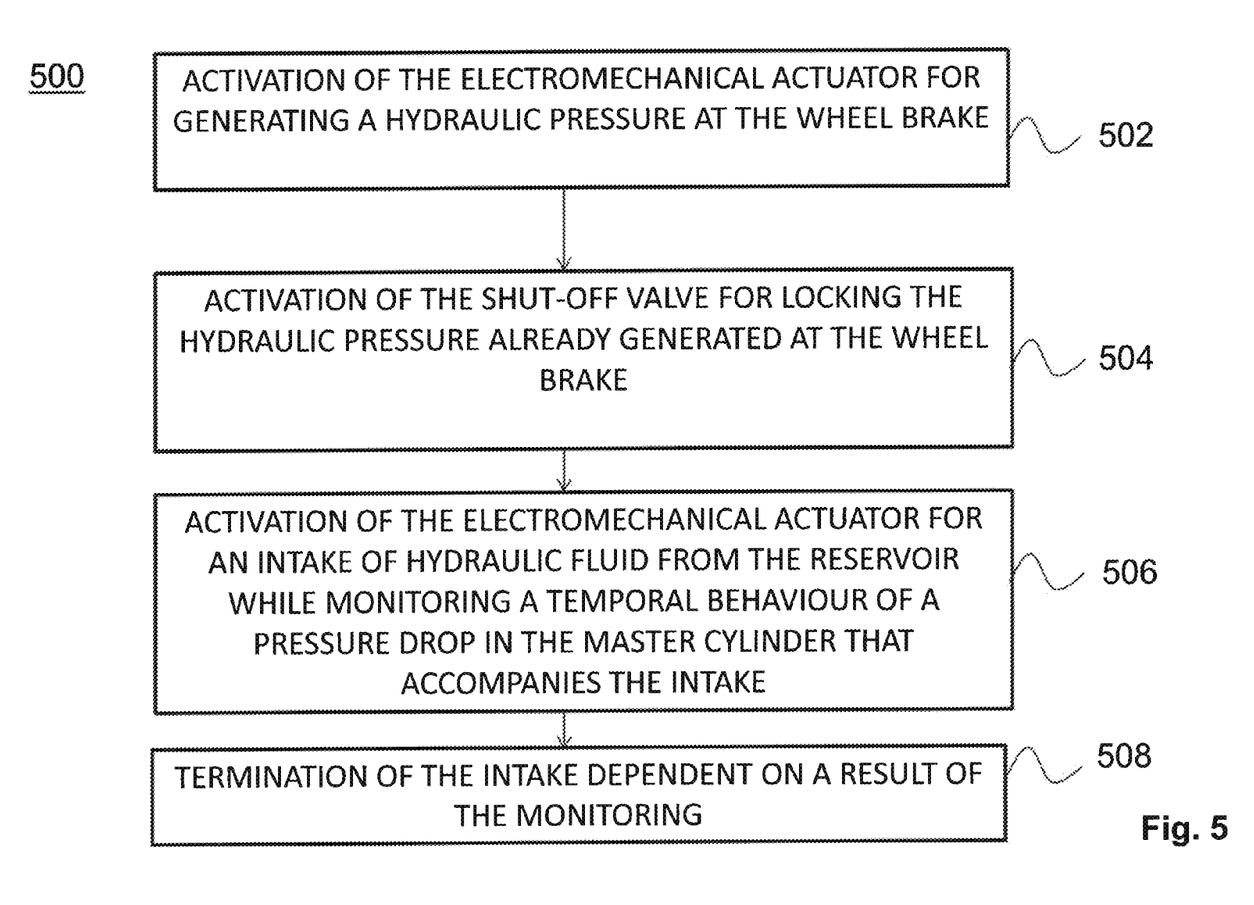
FIG. 5 shows a flow diagram which illustrates an embodiment of a method for operating the electrohydraulic motor vehicle brake system according to one of the preceding figures.

FIG. 5 illustrates in a flow diagram 500 an embodiment of the operation of the electrohydraulic brake system 100 according to one of FIGS. 1 to 4 for a fault detection during the topping up of hydraulic fluid from the reservoir 120 into the master cylinder 110.

First of all, by activating the electromechanical actuator 124 in step 502, a hydraulic pressure is generated at one or more of the wheel brakes FL, FR, RL and RR (e.g. in the case of service braking and/or vehicle dynamics control operation). The fluid connection between the hydraulic chambers 116, 118 on the one hand and the corresponding wheel brakes FL, FR, RL and RR is thereby open. This corresponds, for example in the embodiment according to FIG. 2, to an open state of one or more of the multiplex valves 152, 154, 156, 158. In the embodiment according to FIG. 4, at least one of the TCISO valves is open (and the remaining valves are in the position shown in FIG. 4).

The following steps are carried out for fault detection if, within the context of the hydraulic pressure generation in step 502, hydraulic fluid must be taken from the reservoir 120 into the master cylinder 110 (top up operation). As already explained, such an intake operation can take place, for example, in the case of fading if there is an insufficient volume reserve in the master cylinder 110.

The open shut-off valves (multiplex valves 152, 154, 156, 158 according to FIG. 2 or TCISO valves according to FIG. 4) are first activated in order to close them and lock the hydraulic pressure already generated at the wheel brakes FL, FR, RL and RR (step 504). After the shut-off valves have been closed, the electromechanical actuator 124 is activated for an intake of hydraulic fluid from the pressureless reservoir 120 into the hydraulic chambers 116, 118 (step 506). Together with the activation of the actuator or shortly thereafter, at least one of the valves 170, 172 is opened in order to establish a fluid connection between at least one of the hydraulic chambers 116, 118 and the reservoir 120. As already mentioned, because of the floating mounting of the master cylinder pistons 112, 114, it is sufficient to open one of the valves 170, 172.

Activation of the electromechanical actuator 124 causes the master cylinder pistons 112, 114 to be displaced to the left (see FIGS. 1 to 4). Because of the very high stiffness of the brake pipes, the hydraulic pressure (in the master cylinder 110) falls very sharply within a few ms. Typically, the hydraulic pressure generally drops to approximately 0 bar or to a negative pressure within 10 to 20 ms.

The temporal behaviour of the pressure drop in the master cylinder 110 that accompanies the intake is monitored continuously (for example by means of the pressure sensor 122). If one of the shut-off valves is not closed or not fully closed, this results in a substantially lower stiffness of the brake system 100. This lower stiffness leads to a slower pressure reduction in the master cylinder 110. Thus, in the case of a typical fault, it takes 100 ms or more for the hydraulic pressure in the master cylinder 110 to fall to substantially 0 bar or to a negative pressure. This means that an irregular pressure drop in the master cylinder 110 can be detected after 10 to 20 ms at most.

If, therefore, a fault is detected within the context of the monitoring of the temporal behaviour of the pressure drop in the master cylinder, the intake operation is terminated (step 508). In the event of a fault, the open valve 170, 172 can immediately be closed again, or it is not opened in the first place. Furthermore, the electromechanical actuator 124 can be activated in order to raise the hydraulic pressure in the brake circuits I. and II. as quickly as possible at least to the previous level again. This activation of the electromechanical actuator 124 is preceded by opening of the closed shut-off valves to the wheel brakes FL, FR, RL and RR. As a result, therefore, in the event of a fault, a substantial reduction in the deceleration of the vehicle can be prevented. Furthermore, a fault message can be given to the driver.

The change in different hydraulic pressures in the normal case and in the event of a fault will be explained below with reference to FIG. 6A to 6D.

Figure 6A:
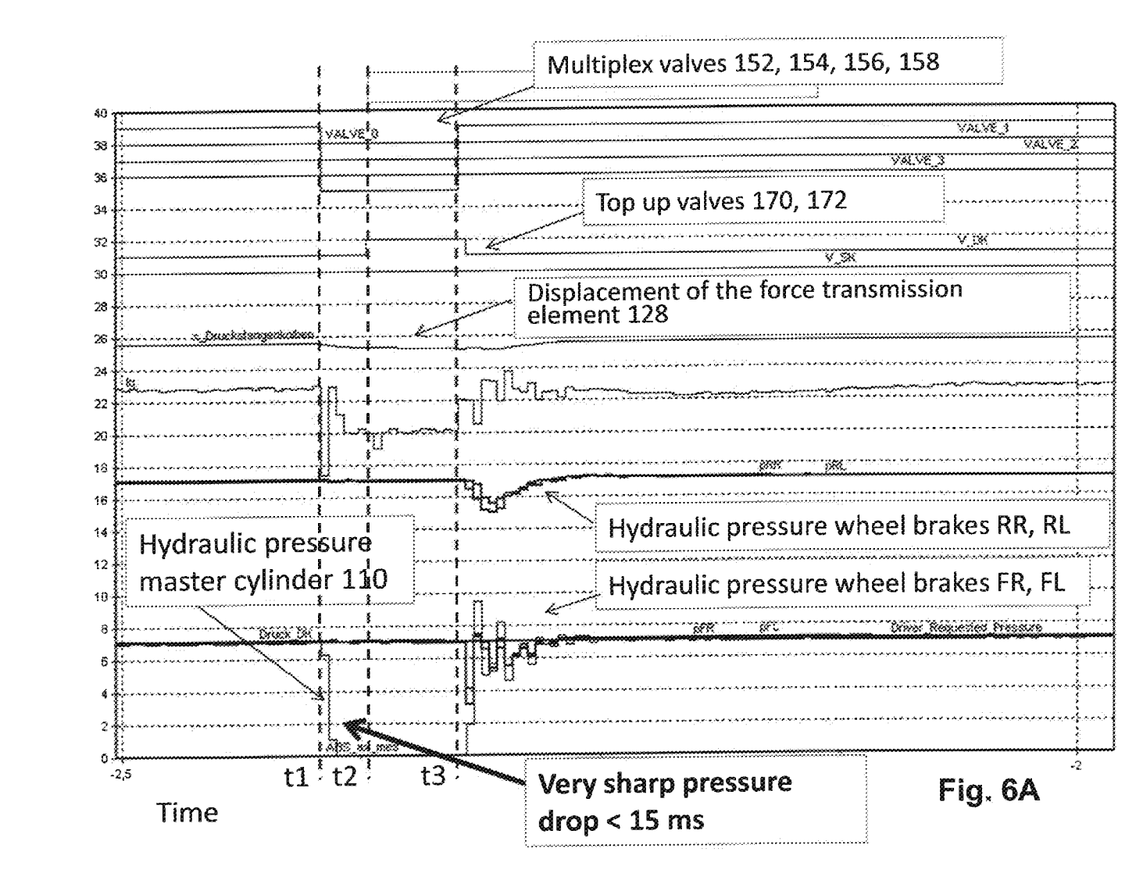
FIG. 6A show diagrams which illustrate hydraulic pressure curves and the activation to 6D of the electromechanical actuator.

FIG. 6A shows an example of a top up scenario for a vehicle that is at a standstill within the context of a test phase. The scenario relates to the motor vehicle brake system according to FIG. 3, which is equipped with the four multiplex valves 152, 154, 156 and 158 according to FIG. 2. The switching states of the multiplex valves 152, 154, 156, 158 are shown in the diagram at the very top, followed by the switching states of the valves 170, 172 for top up operation. These are followed by the characteristic curve of a displacement of the force transmission element 128, which illustrates the actuation of the electromechanical actuator 124. The displacement of the force transmission element 128 here corresponds to the displacement of the gear shaft 138. The following characteristic curves show the hydraulic pressure at the wheel brakes RR, RL of the rear wheel axle, the wheel brakes FR, FL of the front wheel axle and the hydraulic pressure in the master cylinder 110.

FIG. 6A relates to the case of fault-free operation of the multiplex valves 152, 154, 156, 158. FIG. 6A does not show the initial activation of the electromechanical actuator 124 for generating a hydraulic pressure at the four wheel brakes FR, FL, RR and RL. At time t1, a top up operation is initiated for test purposes. For this purpose, the multiplex valves 152, 154, 156, 158 are first activated in order to close them. The hydraulic pressure previously generated at the wheel brakes FL, FR, RL and RR is thus locked.

Shortly thereafter, the electromechanical actuator 124 is activated, so that the master cylinder pistons 112, 114 execute a return stroke. This is illustrated in FIG. 6A by the displacement of the force transmission element 128. Because of the high stiffness of the brake system 100, which is associated with the operability of the closed valves 152, 154, 156, 158, the hydraulic pressure in the master cylinder falls sharply to substantially 0 bar within less than 15 ms. This temporal behaviour of the master cylinder hydraulic pressure indicates operability of the valves 152, 154, 156, 158. For this reason, the valves 170, 172 (or at least one of those two valves) can be opened with a certain delay at time t2 for the intake of hydraulic fluid from the pressureless reservoir 120. The master cylinder pistons 112, 114 continue in the return stroke.

At time t3, the intake operation is then substantially complete. Consequently, the two valves 170, 172 are again in their closed state. In other words, the master cylinder 110 is fluidically uncoupled from the reservoir 120 again. Furthermore, the valves 152, 154, 156, 158 can be opened again, which manifests itself as an only slight pressure drop at the wheel brakes FL, FR, RL and RR. From this point in time, the hydraulic pressure in the master cylinder 110 can be increased again by a corresponding delivery stroke of the master cylinder pistons 112, 114.

Figure 6B:
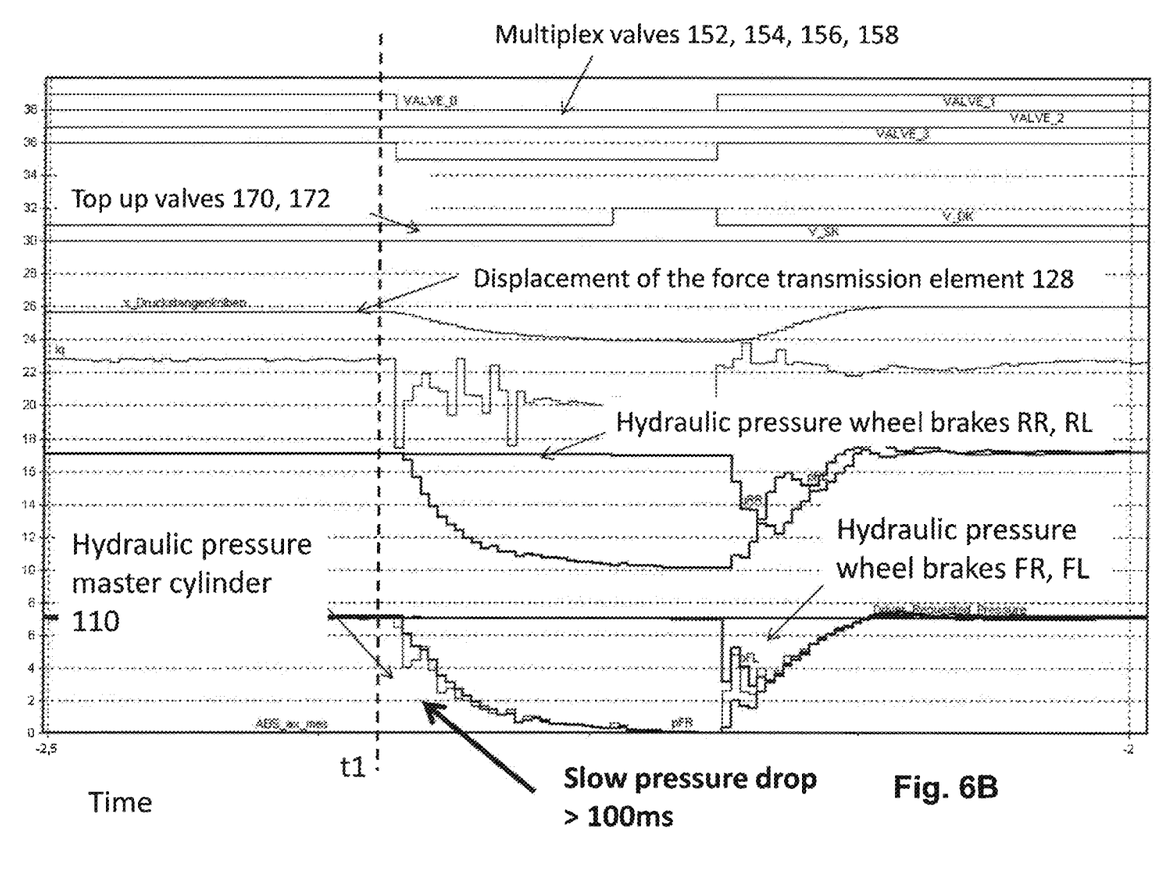

While the scenario according to FIG. 6A demonstrates the operability of the valves 152, 154, 156, 158, FIG. 6B shows the termination of an intake operation in the event of a fault. The fault relates to the fact that two of the four multiplex valves 152, 154, 156, 158 cannot be closed. Because of this, the stiffness of the brake system 100 is significantly reduced, which manifests itself in a comparatively slow pressure drop in the master cylinder 110. The pressure drop to substantially 0 bar takes more than 100 ms. At the same time, because of the two faulty valves, there is a pronounced pressure drop at a wheel brake of the front axle and at a wheel brake of the rear axle, which are assigned to these faulty valves.

Figure 6C:
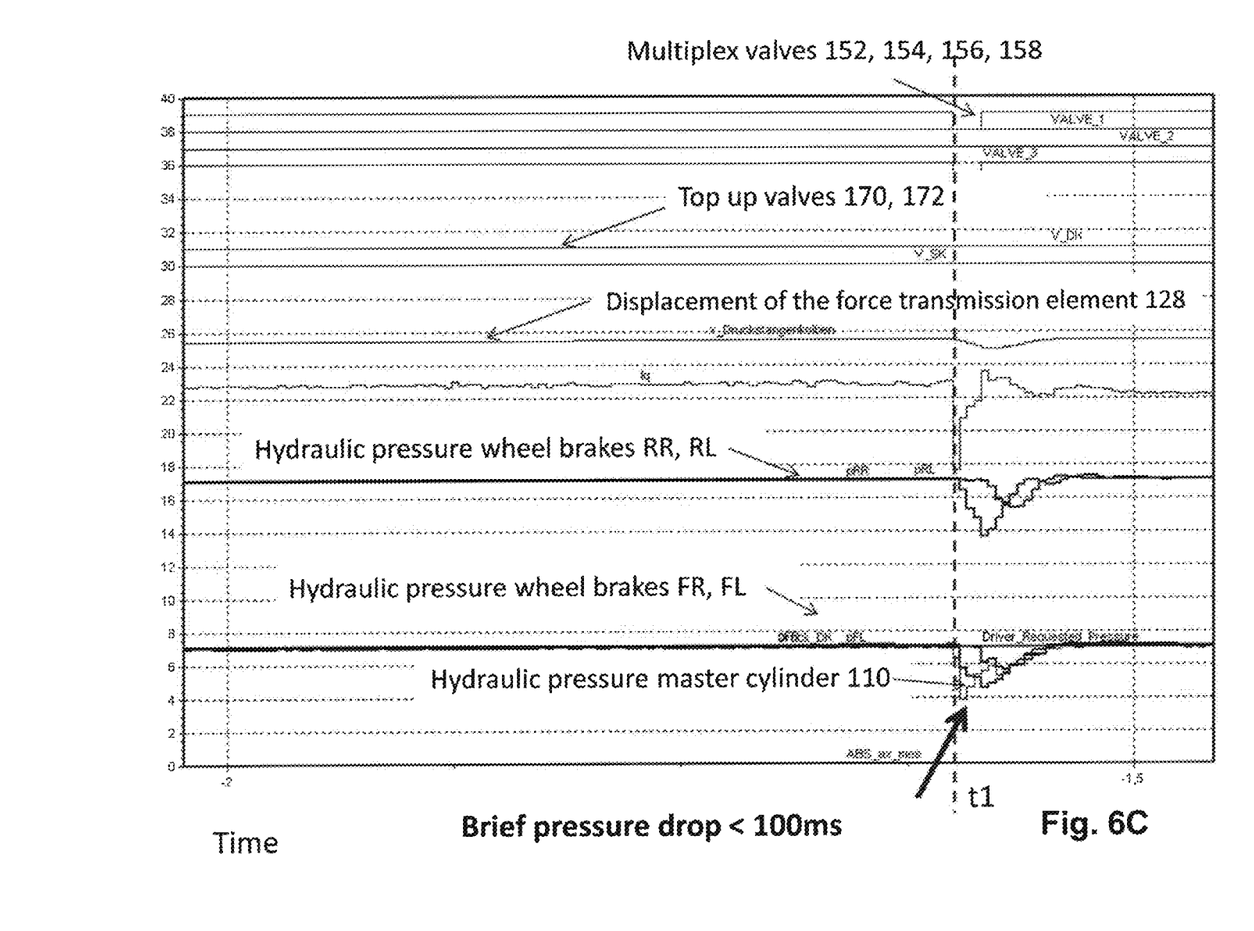

FIG. 6C shows a similar fault as FIG. 6B, only here the intake operation for topping up the master cylinder 110 is terminated immediately after the fault has been detected. For this reason, the hydraulic pressures at the wheel brakes that are assigned to the two faulty multiplex valves fall only for a short time and slightly. The corresponding reduction in deceleration of the vehicle is less than 0.2 g within 200 ms. Furthermore, the hydraulic pressure reduction in the master cylinder 110 is significantly less than 20 bar, before the pressure drop is compensated for again by a delivery stroke of the master cylinder pistons 112, 114.

Figure 6D:
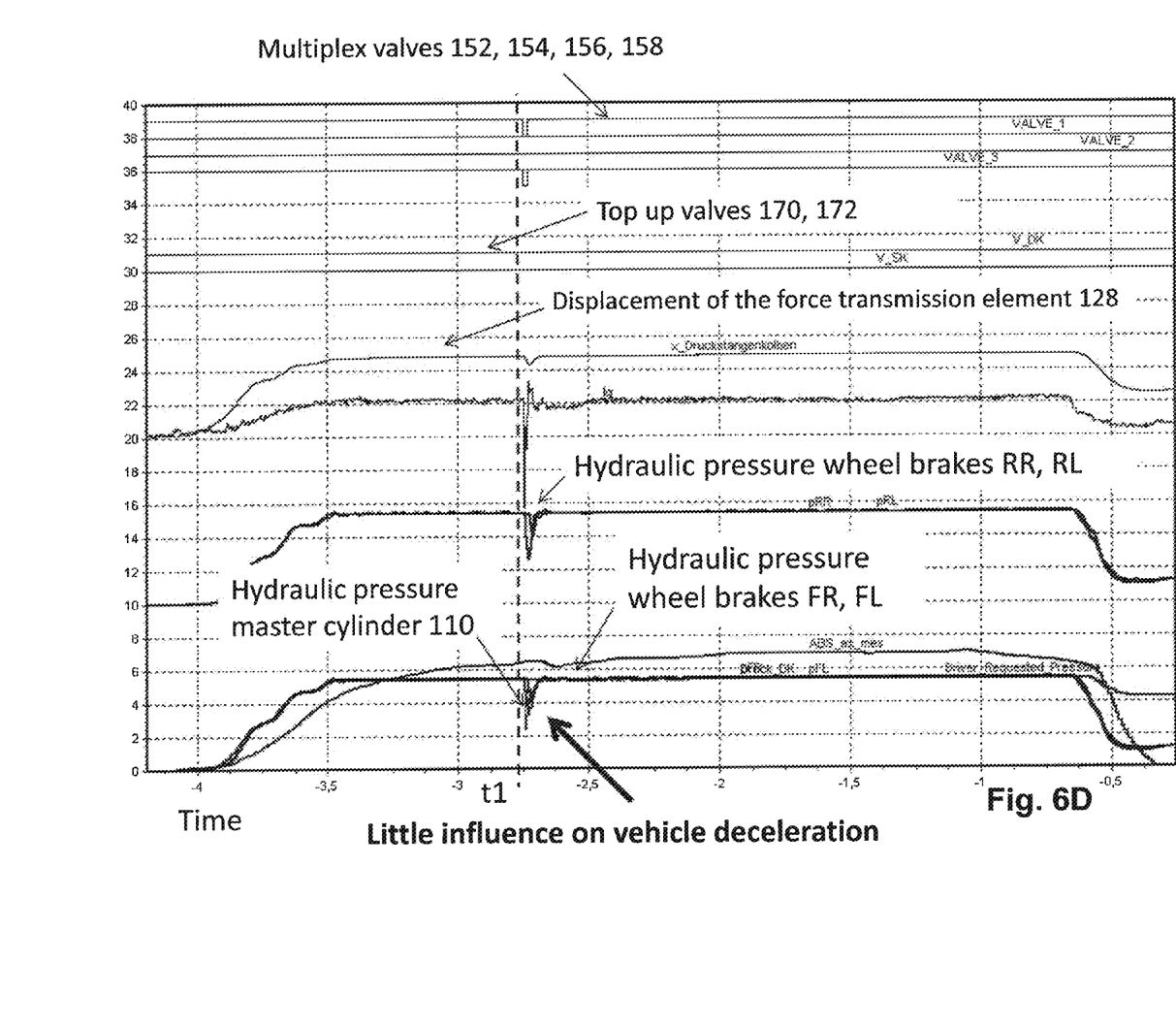

FIG. 6D shows a similar scenario as FIG. 6C. Here too, the intake operation is interrupted because the pressure drop in the master cylinder 110 is too slow. As is illustrated both in FIG. 6C and in FIG. 6D, the fault is detected in both scenarios before even only one of the valves 170, 172 is opened and a "hydraulic short circuit" between the master cylinder 110 and the fluid reservoir 120 is thus produced.

While FIG. 6A to 6C illustrate the test phase in the case of a stationary vehicle, FIG. 6D relates to the case of a moving and thereby constantly decelerated vehicle. It can clearly be seen that, because the intake operation is terminated in good time, there is virtually no negative effect on the vehicle deceleration.

Overall, the technique presented here can thus ensure that faulty valves or incorrect valve activations can reliably be detected. In addition, there is increased safety for top up operations. Because of this increased safety, master cylinders can in principle be designed with smaller volume reserves.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit of scope.

The invention claimed is:

1. A method for operating an electrohydraulic motor vehicle brake system having a cylinder-piston arrangement supplied with hydraulic fluid from a reservoir, an electromechanical actuator for actuating a piston accommodated in the cylinder-piston arrangement, a wheel brake coupled to the cylinder-piston arrangement, and a shut-off valve provided between the cylinder-piston arrangement and the wheel brake, comprising the ordered sequence of steps of:
   activating the electromechanical actuator to actuate a piston of the cylinder-piston arrangement that generates a hydraulic pressure at the wheel brake;
   activating the shut-off valve to lock the hydraulic pressure already generated at the wheel brake;
   activating the electromechanical actuator to actuate the piston to intake hydraulic fluid from the reservoir while monitoring a temporal behaviour of a pressure drop in the cylinder-piston arrangement that accompanies the intake; and
   terminating the intake dependent on a result of the monitoring.

2. The method according to claim 1, wherein the intake is terminated when the result of the monitoring indicates a lack of operability of the shut-off valve or activation of the shut-off valve.

3. The method according to claim 1, wherein the intake is terminated when the pressure drop takes place more slowly than according to a specified time criterion.

4. The method according to claim 3, wherein the specified time criterion states that the pressure drop to a substantially pressureless state must take place within approximately 5 to 50 ms.

5. The method according to claim 1, wherein the intake is terminated before the pressure drop is approximately 10 to 40 bar.

6. The method according to claim 1, wherein in connection with the terminating of the intake, the shut-off valve is activated in order to open it.

7. The method according to claim 1, wherein in connection with the terminating of the intake, the electromechanical actuator is activated to increase the hydraulic pressure.

8. The method according to claim 1, wherein the method is carried out within the context of a test phase in which the vehicle is at a standstill.

9. A computer program product having a programming code for performing the method according to claim 1 when the computer program is run on a processor.

10. A motor vehicle electronic control unit or electronic control unit system comprising the computer program product for performing the method according to claim 9.

11. An electrohydraulic motor vehicle brake system, comprising:
a cylinder-piston arrangement that can be supplied with hydraulic fluid from a reservoir;
an electromechanical actuator for actuating a piston accommodated in the cylinder-piston arrangement;
a wheel brake that can be coupled to the cylinder-piston arrangement;
a shut-off valve provided between the cylinder-piston arrangement and the wheel brake; and
an electronic control unit or electronic control unit system which is configured to perform the ordered sequence of steps to:
activate the electromechanical actuator for generating a hydraulic pressure at the wheel brake;
activate the shut-off valve for locking the hydraulic pressure already generated at the wheel brake;
activate the electromechanical actuator for an intake of hydraulic fluid from the reservoir while monitoring a temporal behaviour of a pressure drop in the cylinder-piston arrangement that accompanies the intake; and
terminate the intake dependent on a result of the monitoring step.

12. The brake system according to claim 11, further comprising:
a valve system for vehicle dynamics control, wherein the shut-off valve is arranged between the cylinder-piston arrangement and the valve system for vehicle dynamics control or is part of that valve system.

13. The brake system according to claim 11, wherein the shut-off valve, together with further shut-off valves which are assigned to further wheel brakes, can be operated in multiplex operation in order to carry out vehicle dynamics control.

14. The brake system according to claim 12, wherein the vehicle dynamics control comprises at least one of the following control systems: an anti-lock brake system, a traction control system, and an electronic stability program.

15. The brake system according to claim 11, wherein the cylinder-piston arrangement defines a hydraulic fluid volume and wherein the dimensions of the cylinder-piston arrangement are such that it has no volume reserve to compensate for fading.

16. The brake system according to claim 11, further comprising:
a mechanical actuator which can be coupled or is coupled to a brake pedal, for actuating the piston accommodated in the cylinder-piston arrangement.

17. The brake system according to claim 11, wherein the cylinder-piston arrangement is a master cylinder of the brake system.

* * * * *